(12) United States Patent
Ueda et al.

(10) Patent No.: US 8,145,041 B2
(45) Date of Patent: Mar. 27, 2012

(54) VIDEO PROCESSING DEVICE

(75) Inventors: Hisataka Ueda, Osaka (JP); Hiroshi Yahata, Osaka (JP); Masanori Itoh, Osaka (JP); Hideaki Mita, Hyogo (JP)

(73) Assignee: Panasonic Corporation, Osaka (JP)

( * ) Notice: Subject to any disclaimer, the term of this patent is extended or adjusted under 35 U.S.C. 154(b) by 1322 days.

(21) Appl. No.: 11/721,604

(22) PCT Filed: Oct. 19, 2005

(86) PCT No.: PCT/JP2005/019638
§ 371 (c)(1),
(2), (4) Date: Jun. 13, 2007

(87) PCT Pub. No.: WO2006/064612
PCT Pub. Date: Jun. 22, 2006

(65) Prior Publication Data
US 2009/0245749 A1    Oct. 1, 2009

(30) Foreign Application Priority Data

Dec. 13, 2004  (JP) .................................. 2004-359406

(51) Int. Cl.
*H04N 5/917* (2006.01)
(52) U.S. Cl. ..................... 386/328; 386/241; 375/240.26
(58) Field of Classification Search .................. 386/328, 386/241; 375/240.26
See application file for complete search history.

(56) References Cited

U.S. PATENT DOCUMENTS

| | | | |
|---|---|---|---|
| 4,646,167 A | * | 2/1987 | Denecke ........................ 386/202 |
| 6,453,119 B1 | | 9/2002 | Maruyama et al. |
| 2005/0183018 A1 | | 8/2005 | Shinkai et al. |

FOREIGN PATENT DOCUMENTS

| EP | 1 443 760 A | 8/2004 |
|---|---|---|
| EP | 1443760 A1 * | 8/2004 |
| JP | 08-046903 | 2/1996 |
| JP | 2001-292411 | 10/2001 |

OTHER PUBLICATIONS

International Search Report for corresponding International PCT Application No. PCT/JP05/019638 dated Jan. 3, 2006.

* cited by examiner

*Primary Examiner* — Thai Tran
*Assistant Examiner* — Girumsew Wendmagegn
(74) *Attorney, Agent, or Firm* — RatnerPrestia

(57) ABSTRACT

A video processing device includes: encoder for generating a compressed video data by compressing and encoding a video data from camera unit; and system control unit for recording the compressed video data during a recording period from a recording start time to a recording end time as a video file and for recording, into recording memory, additional data as an index file that is information related to a compressed video data to be recorded in recording memory and, for reading the additional data together with the compressed video data from recording memory. System control unit records, into recording memory, the additional data recorded in the index file. The additional data is composed of additional data regarding the compressed video data recorded during the recording period and another additional data including a time code value showing a time at which a compressed video data to be recorded next is started.

9 Claims, 7 Drawing Sheets

FIG. 3

Media index table (for each media)

| Title | Contents |
|---|---|
| Media ID | ID unique to each medium |
| Media Title | Title unique to medium |
| New TC Proposal | Start time record value for next recording |

FIG. 4

Clip index table (for each Clip)

| Title | Contents |
|---|---|
| Clip ID | ID unique to Clip |
| Clip Title | Title of Clip |
| UMID | Description of UMID of Clip |
| Frame Rate | Frame rate of video |
| Duration | Clip length (number of frames) |
| Sequence NO. | Audio sequence NO. at the top of clip |
| Start TC | Start time code value of material |
| Drop Frame | 1: Drop frame, 0: Non-drop frame |
| End TC | Final time code value of material |
| Continuous TC Flag | Continuousness of time codes in material (1: Continuous, 0: Discontinuous) |
| Valid TC Flag | Information for validity of time codes in material (1: Valid, 0: Invalid) |

Media Index,
  M001,,00:05:06:08,0
Clip Index,
  C001,Clip1(UMID0),30,9187,0,00:00:00:00, 0,00:05:06:07,1,1
  C002,Clip2(UMID1),30,7323,0,00:05:06:08, 0,00:09:10:11,1,1

Index.txt

Media Index,
  M001,,00:05:06:08,0
Clip Index,
  C001,Clip1(UMID0),30,9187,0,00:00:00:00, 0,00:05:06:07,1,1

Recording memory 116
Media ID M001

FIG. 9

```
Media Index,
  M001,,00:01:00:01,0
Clip Index,
  C001,Clip1,(UMID0),30,9187,0,00:00:00:00, 0,00:05:06:07,1,1
  C002,Clip2,(UMID1),30,7323,0,00:05:06:08, 0,00:09:10:11,1,1
  C003,Clip3,(UMID2),30,7388,0,00:09:08:07, 0,00:13:14:15,1,1
  C004,Clip4,(UMID3),30,1617,0,01:00:00:00, 0,00:01:00:00,0,0
```

FIG. 10

```
Media Index,
  M001,,00:14:10:19,0
Clip Index,
  C001,Clip1,(UMID0),30,9187,0,00:00:00:00, 0,00:05:06:07,1,0
  C002,Clip2,(UMID1),30,7323,0,00:05:06:08, 0,00:09:10:11,1,0
  C003,Clip3,(UMID2),30,7388,0,00:09:10:12, 0,00:13:16:20,1,0
  C004,Clip4,(UMID3),30,1617,0,00:13:16:21, 0,00:14:10:18,1,0
```

VIDEO PROCESSING DEVICE

This Application is a U.S. National Phase Application of PCT International Application PCT/JP2005/019638 filed Oct. 19, 2005.

TECHNICAL FIELD

The present invention relates to a video processing device that records contents data including video data to a randomly-accessible recording medium to reproduce the recorded contents data from this recording medium. In particular, the present invention relates to a video processing device that records, together with the video data, metadata including data regarding a time code.

BACKGROUND ART

Recently, devices have been generally used that file and record video data and/or audio data in a randomly-accessible recording medium (e.g., optical disk, semiconductor memory). For example, in broadcasting stations and video production companies or the like, editing devices including the recording media as described above have been used for a video editing operation. In order to provide the video editing operation as described above, contents data (e.g., video data, audio data) is recorded in a recording medium together with metadata as additional information to these contents. The metadata is used to improve the efficiency of the editing operation for example.

With the background as described above, a method for recording metadata as additional information regarding video data or audio data (material) recorded in a recording medium is disclosed in Japanese Patent Unexamined Publication No. 2001-292411 (hereinafter referred to as "Patent Publication 1").

In broadcasting stations and video production companies, video and audio or the like (hereinafter may be referred to as "material") is recorded and these materials are edited and processed to produce a program for broadcasting. The video data and audio data of this program are stored with them recorded in a recording medium. The recording medium is recorded with additional information for identifying the material in detail in the respective processing steps as described above (e.g., the one for recording the material, the one for editing the material, the one for storing the material) and the additional information is used for each processing of the material. The additional information includes metadata. Metadata is data describing, for example, information required for identifying the material obtained through interview or recording (e.g., the time of the recording, the recording ID (IDentifier, identification information), the title of the recording, the name of the cameraman).

As described above, in a recording step for recording the respective pieces of data as material (hereinafter referred to as "material data") in a recording medium, metadata is recorded together with material data. Metadata added to material is classified into the two types of pieces of metadata as shown below. One type of metadata is metadata previously determined in a planning stage. This metadata includes information showing the times at which video shooting is started and completed, information showing the place of the video shooting (place name), and information showing the cameraman, for example. The other type of metadata is metadata that is generated simultaneously with the video shooting and is recorded in the recording medium. This metadata includes, for example, position information detected by the GPS (Global Positioning System) (e.g., latitude, longitude, altitude), time information, information for the name of a place where the recording is performed, information regarding a machine used for the video shooting (machine ID), information for camera setup (e.g., information regarding lens), UMID Unique Material IDentifier) for identifying the material, and information regarding duration required for the video shooting. The metadata that was recorded together with the material data in the recording medium by the shooting step as described above is associated with the material and is used in subsequent steps. The metadata is a means that is particularly useful for improving the handling and convenience of desired data when the data is searched.

By the way, in an editing step or the like, a time code representing hour, minute, and second of each frame and representing the frame information of the video data is identification information that is very useful when the video data is searched frame by frame in an editing operation for example. Thus, the time code has been conventionally used for a video editing operation or the like. In view of the above, a method has been suggested for editing material using metadata including the data regarding the time code. For example, Patent Publication 1 discloses that a time code showing the start time of each filed material (hereinafter may be collectively referred to as "time" including hour, minute, and second and the information frame by frame that is represented by the frame No. for example). The time code is recorded as metadata generated at the video shooting as described above as the other type. The time code is used as a time code representing each material.

With regards to the addition of the time code to the video data, it has been desired that, in order to provide the search of the video frame by frame while securing the continuity of each frame, the video data is not added with duplicate time codes at the video shooting and the respective materials are provided with continuous time codes. To realize this, in a conventional camera recorder which records data in a magnetic tape medium for example, the recording is generally performed based on a method as described below. In this method, the time code values of tape positions to be recorded are read and the read time code values are given to the video data such that the given time code values are continuous to correspond to the time code values of the tape positions.

However, when a device in which video data is filed and recorded in a randomly-accessible recording medium is used to record new video data by giving, to the new video data, continuous time codes starting from a section next to the last section of already-recorded material in the recording medium, the time codes in the video data of the already-recorded material are not always continuous. The reason is that one video file in the already-recorded material is recorded with recording and pause operations or repeated recording operations, for example. This has caused a possibility that the value of the final time code calculated based on the start time recorded in the time code of the material and the duration for the video shooting does not correspond to the value of the final time code recorded in the video data of the final frame.

Thus, in order to secure the continuity of each frame, the value of the final time code of the already-recorded material must be obtained, thus requiring the scanning of the time codes in the video data file of the already-recorded material. However, when a compression method such as MPEG2 (Moving Picture Coding Experts Group 2) in which video data is encoded by inter-frame compression, streaming, packeting or the like and is recorded is used, the data must be decoded in order to obtain the value of the final time code.

This has caused a problem that too much processing time for obtaining the value of the final time code is required and it causes difficulty in securing quick response.

When a user searches desired video data in all materials by specifying the value of a time code of the data, time codes in the video data of all materials must be scanned. This has also caused the problem of an increased processing time.

DISCLOSURE OF INVENTION

The present invention is suggested in order to solve the problems as described above. The present invention provides a video recording/reproducing device that determines, when recording video data, a non-duplicate time code with a high speed, thereby allowing a high-speed image search based on the time code.

In order to solve the above-described problems, the video processing device of the present invention records recording information at least including a compression-encoded video data into recording medium for recording and reproduction and reproduces the recording information recorded in the recording medium. The video processing device of the present invention includes: a camera unit for supplying a video data to be recorded in the recording medium; an encoder for generating a compressed video data by compressing and encoding the video data from the camera unit; and a system control unit which records, into the recording medium, the compressed video data as a video file that is supplied from the encoder during a recording period from a recording start time to a recording end time and additional data as an index file that is information related to the compressed video data recorded in the recording medium, and reproduces the compressed video data from the video file set in the recording medium and reads the additional data from the index file. Furthermore, the system control unit of the video processing device of the present invention records, into the recording medium, the additional data recorded in the index file regarding the compressed video data recorded during the recording period and another additional data including a time code value showing a start time of the recording of compressed video data to be recorded.

BRIEF DESCRIPTION OF DRAWINGS

FIG. 3 shows an example of the configuration of a media index table.

FIG. 4 shows an example of the configuration of a clip index table.

FIG. 9 shows the contents of an index file before change.

FIG. 10 shows the contents of the index file after change.

BEST MODE FOR CARRYING OUT THE INVENTION

Hereinafter, embodiments of the present invention will be described with reference to the drawings.

Embodiment

Figure 1:
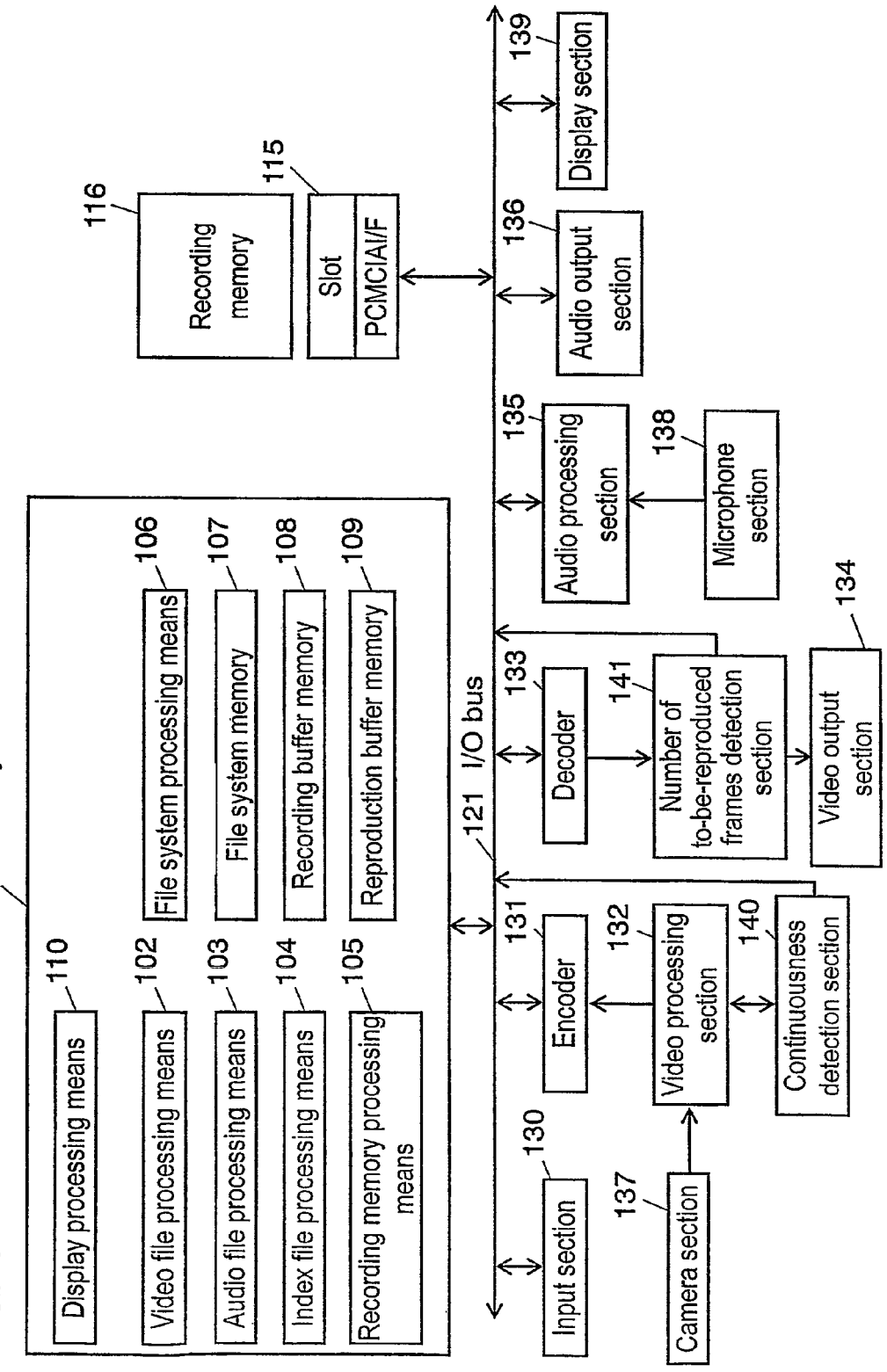
FIG. 1 illustrates a block diagram of a camera recorder as a video processing device of the present invention.

FIG. 1 is a block diagram of a video processing device in one embodiment of the present invention. This embodiment will be described based on an example of a camera recorder that includes a camera unit for shooting an object, and a recording/reproduction means for recording, in a recording medium, the video picture shot by the camera unit as compressed and encoded video data and for reproducing the compressed video data recorded in the recording medium. The camera recorder as described above is a device for the use by professionals such as broadcasters and is used for the coverage of a site of a video shooting. In a site of a video shooting, the material data obtained by this camera recorder is recorded in a recording medium that is detachably attached to this camera recorder, for example. Then, in the broadcasting station, this material data recorded in the recording medium is used to edit a program together with another material data.

As shown in FIG. 1, a camera recorder as this video processing device includes: system control unit 101 for managing and controlling the respective units of the camera recorder and/or a recording medium; I/O bus 121 for commonly connecting the respective units for the transmission of various pieces of data among the respective units; and PCMCIA I/F unit 115 as an interface for connecting recording memory 116 as a detachable recording medium. This camera recorder also includes: input unit 130 through which a user inputs an instruction for the recording or reproduction of compressed video data or audio data; camera unit 137 for obtaining the video taken by an image sensor (e.g., CCD) as a video signal; and video processing unit 132 for performing a preprocessing of the video signal and for converting the video signal into digital video data. This camera recorder also includes: encoder 131 for generating compressed video data by compressing and encoding the video data; microphone unit 138 for inputting an audio signal; and audio processing unit 135 for pre-processing the inputted audio signal and for converting the audio signal into a digital audio data. This camera recorder also includes: decoder 133 for decoding the compressed video data to recover the data to original video data; video output unit 134 for outputting the recovered video data; and audio output unit 136 for outputting the audio data. This camera recorder also includes: display unit 139 for displaying the operation status of the device to the user; continuousness detection unit 140 for detecting the continuousness of the time codes in the video data; and number of to-be-reproduced frames detection unit 141 for detecting the number of to-be-reproduced frames counted from the top of the material by using a to-be-reproduced frame counter.

Recording memory 116 is a recording medium that is detachable to this camera recorder. In this embodiment, an example will be described in which recording memory 116 is the PCMCIA format one and is detachable to the camera recorder. Recording memory 116 and PCMCIA I/F unit 115 (hereinafter may be referred to as "I/F unit 115") are connected to each other based on a PC card specification.

This embodiment will describe a case in which system control unit 101 is realized, for example, by a microcomputer and a memory (not shown). The respective processing means included in system control unit 101 are realized by allowing the microcomputer to execute various programs stored in the memory. System control unit 101 includes: file system processing means 106 in which a microcomputer executes a program stored in a memory to perform a processing so that recording and reproduction are performed based on a predetermined file format to recording memory 116; display processing means 110 for displaying the operation status of the device; and video file processing means 102 for processing the compressed video data based on the predetermined file format. System control unit 101 also includes: audio file processing means 103 for processing the audio data based on the predetermined file format; index file processing means 104 for performing a processing regarding an index file showing data for managing the respective files recorded in recording memory 116; and recording memory processing means 105 for performing a processing such as the one for securing a recording region in the recording memory 116. System control unit 101 also includes recording buffer memory 108 that is used as a data buffer when compressed video data or audio data is recorded in recording memory 116; reproduction buffer memory 109 that is used as a data buffer when compressed video data or audio data recorded in recording memory 116 is reproduced; and file system memory 107 to be used for a recording processing or a reproduction processing by file system processing means 106. The respective memories included in system control unit 101 also may be realized by, for example, dividing regions of a single memory for different applications, including memories storing therein the respective programs.

In this camera recorder having the structure as described above, when a user gives input unit 130 an instruction for starting to shoot for example, a video signal is outputted from the camera unit 137 and this video signal is supplied to video processing unit 132. The supplied video signal is converted into digital video data by video processing unit 132 and this video data is supplied to encoder 131. Together with this video signal, time codes showing time information based on the respective frames of this video signal are also supplied from camera unit 137 to video processing unit 132. The time codes supplied to video processing unit 132 are notified to continuousness detection unit 140.

Continuousness detection unit 140 determines the continuousness of the time codes by monitoring whether the notified time codes are sequentially supplied frame by frame. When continuousness detection unit 140 determines that time codes are supplied sequentially frame by frame during a predetermined period, continuousness detection unit 140 notifies the continuousness of the time codes via I/O bus 121 to index file processing means 104 of system control unit 101. Specifically, discontinuousness of time codes is caused when a user instructs a pause operation to input unit 130 while material data constituting one video file is being recorded, for example. In such a case, continuousness detection unit 140 sends to index file processing means 104 information that the discontinuousness of time codes is caused.

On the other hand, video data supplied to encoder 131 is compressed and encoded by encoder 131 based on, for example, MPEG2 method widely used as a video compression method or SMPTE (Society of Motion Picture and Television Engineers)-314M (DV-Based 25M) specification as one of specifications for professional digital VTRs (Video Tape Recorder). The compressed video data generated by the compression and encoding processings by encoder 131 is supplied via I/O bus 121 to system control unit 101.

The compressed video data supplied to system control unit 101 is supplied to recording buffer memory 108. System control unit 101 performs a pre-processing for a recording processing as described below.

First, in system control unit 101, file system processing means 106 performs a processing for generating, in accordance with the instruction from the user via input unit 130, a file in which compressed video data being processed for recording memory 116 is stored. Specifically, when the user gives an instruction for recording new material data for example, file system processing means 106 performs a processing as described below. Specifically, file system processing means 106 generates file-related information so that the new material data is recorded in recording memory 116 for example and records such file-related information in file system memory 107 to use the data as management data for managing recording memory 116.

Furthermore, in system control unit 101, prior to the recording of the compressed video data, additional information (e.g., information regarding the to-be-generated file, information regarding recording memory 116 to be recorded) is updated. The additional information as described above is recorded, by index file processing means 104, as index data into an index file provided in recording memory 116. The index file includes a media index table in which additional information regarding individual recording memories 116 is recorded, and a clip index table in which additional information for the respective files is recorded.

Furthermore, prior to the recording of the compressed video data, recording memory processing means 105 starts a processing regarding a free space of recording memory 116 to which the compressed video data is written. Recording memory processing means 105 obtains the file-related information from file system processing means 106 and secures a free space in recording memory 116 according to this information. When there is no available free space, recording memory processing means 105 notifies the unavailability of recording to the user via display unit 139 for example.

When recording memory processing means 105 secures a predetermined file space in recording memory 116, pieces of compressed video data sequentially supplied to recording buffer memory 108 are sent from video file processing means 102 to recording memory 116 via I/O bus 121 and I/F unit 115. Then, the sent compressed video data is written to the recording space secured as the predetermined file.

When the user gives input unit 130 an instruction for stopping the shooting, the supply of video signals from camera unit 137 is completed and the writing of compressed video data into recording memory 116 is also completed.

By the execution of the series of recording operations as described above, the video taken by camera unit 137 is recorded, as compressed video data file filed as one file, into recording memory 116. As a result, one compressed video data file is newly produced in recording memory 116.

Next, when the user gives input unit 130 in this camera recorder an instruction for starting reproduction for example, video file processing means 102 in system control unit 101 performs an operation for reading the file specified by recording memory 116. Video file processing means 102 sequentially reads pieces of compressed video data from the specified file in recording memory 116. The read compressed video data is supplied via I/F unit 115 and I/O bus 121 to reproduction buffer memory 109. The supplied compressed video data is temporarily stored in reproduction buffer memory 109. Furthermore, video file processing means 102 sends the compressed video data temporarily stored in reproduction buffer memory 109 to decoder 133 via I/O bus 121.

Decoder 133 performs a decompressing processing for decoding the compressed video data to recover original video data. Specifically, decoder 133 decompresses the compressed video data and video data is recovered. The recovered video data is supplied to number of to-be-reproduced frames detection unit 141.

Number of to-be-reproduced frames detection unit 141 counts the number of sequentially supplied frames of the video data to notify the result of the count via I/O bus 121 to system control unit 101. After counting the frames of the video data, number of to-be-reproduced frames detection unit 141 supplies the video data to video output unit 134. Video output unit 134 converts the supplied video data into video signals to display a to-be-reproduced image on a monitor provided in the camera recorder, for example.

By the execution of the series of reproduction operations, the compressed video data recorded in recording memory 116 is read and a to-be-reproduced video is outputted from video output unit 134.

When a user gives an instruction to input unit 130 of this camera recorder for starting a shooting operation on the other hand, the video-taking by video via camera unit 137 and the audio-taking via microphone unit 138 are started. The audio taken via microphone unit 138 is supplied as audio signals to audio processing unit 135. Audio processing unit 135 converts the supplied audio signals into digital audio data to compress the audio data to generate compressed audio data. Then, audio processing unit 135 supplies the generated compressed audio data via I/O bus 121 to system control unit 101.

The compressed audio data supplied to system control unit 101 is supplied to recording buffer memory 108. Pieces of compressed audio data sequentially supplied to recording buffer memory 108 are sent from audio file processing means 103 to recording memory 116 via I/O bus 121 and I/F unit 115, as in the case of the processing to compressed video data. Then, the compressed audio data is written into a predetermined file space of recording memory 116 set by file system processing means 106.

By the processing as described above, the audio taken by microphone unit 138 is recorded, simultaneously with the taking of the video, into recording memory 116 as two compressed audio data files filed to correspond to the respective two left and right channels.

When input unit 130 in this camera recorder receives from the user an instruction for starting the reproduction, the reading of the compressed video data as well as the compressed audio data from recording memory 116 are started. When the instruction for starting the reproduction is given, audio file processing means 103 in system control unit 101 executes the reading of the specified audio file in recording memory 116. Audio file processing means 103 sequentially reads, from the specified audio file in recording memory 116, pieces of compressed audio data and the read compressed audio data is supplied via I/F unit 115 and I/O bus 121 to reproduction buffer memory 109. The supplied compressed audio data is temporarily stored in reproduction buffer memory 109. Furthermore, audio file processing means 103 sends the compressed audio data temporarily stored in reproduction buffer memory 109 via I/O bus 121 to audio output unit 136. Audio output unit 136 converts the supplied audio data into audio signals to present, to the user, the to-be-reproduced audio from a speaker provided in the camera recorder for example.

By the execution of the series of reproduction operations as described above, the compressed audio data recorded in recording memory 116 is read and to-be-reproduced audio is outputted from audio output unit 136.

As is known, the recording and reproduction of video and audio are generally performed in parallel. Specifically, the recording operations of video and audio are started and completed in a synchronized manner and the reproduction operations of the video and the audio are started and completed in a synchronized manner.

In the above section, basic operations in the recording and reproduction processings in this camera recorder have been described. As briefly described in the above section, system control unit 101 performs the processing for reproducing the data with a file format and the processing for the additional information of the data stored in recording memory 116. The following section will describe a file system processing and a processing for index data as additional information by system control unit 101.

First, system control unit 101 provides, to recording memory 116, the recording for recording compressed video data and compressed audio data and the processing or control for the reproduction in accordance with the format of the recording medium. In the recording medium (e.g., memory card using a semiconductor memory, DVD as one type of optical disk), a logical format is used in accordance with a specification. A method for recording to-be-recorded data while managing the data with the file format is also determined by a file system specification. In the case of the above-described SMPTE-314M specification as one specification for professional digital VTRs for example, the minimum unit of compressed video data is called as DIF (Digital Interface) block. A plurality of DIF blocks constitute one frame so that a set of such frames constitute one DIF format file.

In order to provide a function as a file system in accordance with the specification as described above in which compressed video data or compressed audio data is recorded in recording memory 116 to reproduce the data from recording memory 116, file system processing means 106 provides, to recording memory 116, a format processing based on the predetermined file system specification. After the format processing as described above, recording memory 116 can be recorded with data.

As described above, the camera recorder as the video processing device of the present invention is characterized in that not only compressed video data and compressed audio data but also index data as additional information of these pieces of material data is recorded in recording memory 116. The index data as described above is data that shows information related to the respective pieces of material data recorded in a coverage for example (i.e., metadata). This camera recorder records, in a index file of recording memory 116, the metadata as described above as index data such that the index data corresponds to each material and each recording memory 116.

Figure 2:
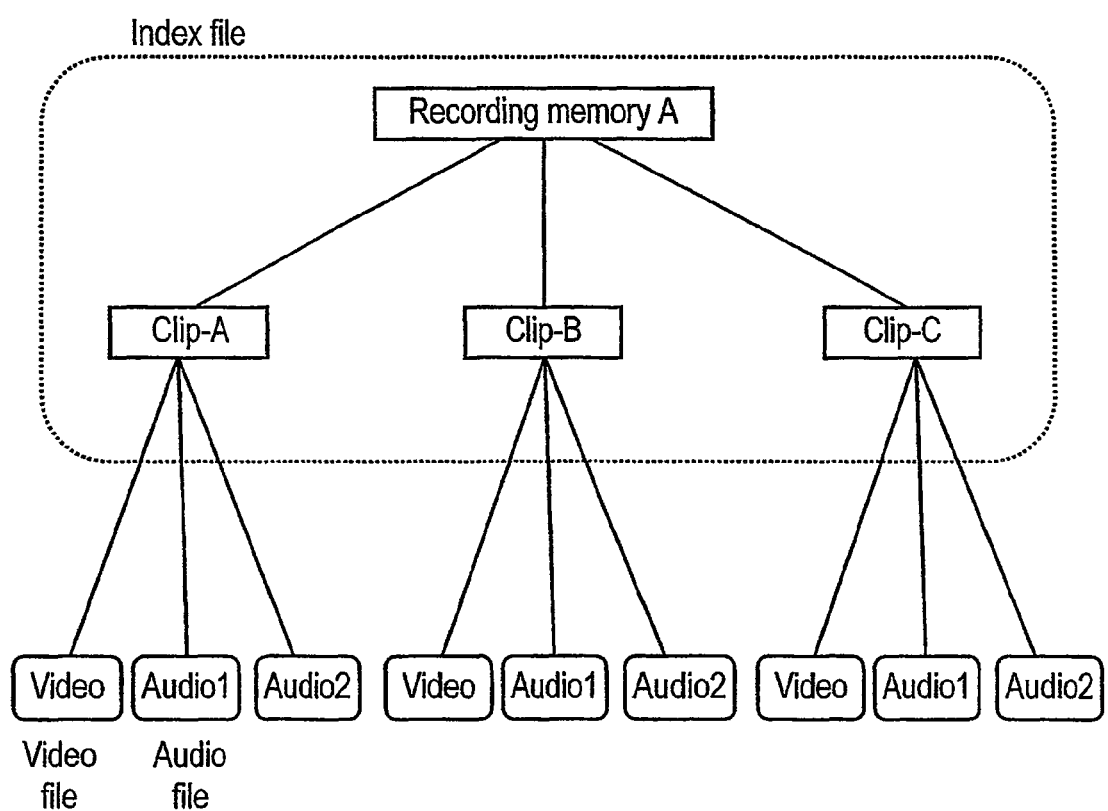
FIG. 2 illustrates the outline of an index file included in a recording memory.

FIG. 2 shows the outline of the index file provided in recording memory 116. Only one index file is generated so as to correspond to one recording memory 116.

In order to produce the index file as described above to recording memory 116, after the format processing to recording memory 116, the index file processing means 104 generates, on recording memory 116, an index file having the configuration as described below.

As shown in FIG. 2, an index file includes the index table having a two-layer structure. The upper layer is a media index table as shown as recording memory A of FIG. 2 for recording the each piece of information corresponding to each recording memories 116. In this media index table, metadata unique to each recording memories 116 is recorded. The lower layer is clip index tables as shown as Clip-A, Clip-B, and Clip-C of FIG. 2 for recording the information corresponding to the respective pieces of recorded material data. In this clip index table, metadata unique to each material data is recorded. The term "clip" means a recording operation on the basis of a period from the start of the recording of material data to the completion of the recording. As shown in FIG. 2, one clip is linked with one video file and two audio files. Specifically, whenever material data is recorded, one video file and two audio files for storing therein material data are generated and the index file newly includes another clip index table and metadata corresponding to the material data is recorded in this new clip index table.

FIG. 3 shows an example of the configuration of a media index table. FIG. 4 shows an example of the configuration of a clip index table.

In the media index table shown in FIG. 3, "Media ID" is an identifier (hereinafter may be referred to as "ID") that is added to each medium (i.e., each recording memory 116) so that the ID is unique to the medium. For example, when a medium is formatted, a unique ID can be added to the medium by the combination of the ID of the device and the time at which the medium is formatted, for example.

"Media Title" is a title unique to a medium that can be arbitrarily added by a user and can be freely added with a name that can be easily recognized by the user. The medium in the device is identified by "Media ID". Thus, "Media Title" can be freely changed even when a video file or an audio file is recorded in the medium.

"New TC Proposal" is a start time code value at which the next recording is started and is a start request time code of a clip recorded in this recording memory 116. The camera recorder as the video processing device of the present invention is characterized in that, whenever index file processing means 104 generates a media index table including "New TC Proposal" item as described above on recording memory 116 and executes a processing for recording each clip, the camera recorder records, to "New TC Proposal" item, a start request time code to be added to compressed video data to be recorded next. Specifically, this camera recorder is characterized in that this camera recorder adds a time code for each frame to compressed video data being recorded and writes, when this recording is completed, a time code for the top frame of compressed video data to be recorded next as a start request time code to "New TC Proposal" item of the media index table. By providing the "New TC Proposal" item as described above in the media index table so that this start request time code is recorded in "New TC Proposal" when the recording is completed, the necessity is eliminated for a processing, to determine, when a new recording is started, a time code for the top frame of compressed video data to be newly recorded for example. Thus, when compressed video data is recorded, non-duplicate time codes can be determined with a high speed.

In the clip index table shown in FIG. 4, "Clip ID" is an ID that is added to each clip so that the Clip ID is unique to the clip. For example, when a clip is recorded, a unique ID can be added to the clip by the combination of the ID of the device and a time at which the recording is started for example. By describing this "Clip ID" in a file name, an association between a video file and an audio file and a clip is performed. For example, in the case of "Clip ID" of C001, a clip can be associated with one video file and two audio files for two audio channels by naming the video file as "C001.DIF" and by naming the two audio files as "C001_1.WAV" and "C001_2.WAV".

"Clip Title" is a title unique to a clip that can be arbitrarily added by a user and can be freely given with a name that can be easily recognized by the user. The clip in the device is identified by its "Clip ID". Thus, "Clip Title" can be freely changed even when a video file or an audio file is recorded.

"UMID (Unique Material Identifier)" is an ID for identifying material specified by SMPTE330 specification. UMID is determined so that the UMID is unique to each Clip.

"Frame Rate" shows a frame frequency of video signals. "Duration" shows the number of frames included in a clip. By "Frame Rate" and "Duration", a time for recording the entire clip can be calculated.

"Sequence NO." shows the number of the sequence at the top of the clip. Sequence NO. is the number of 0 to 4 given to each one frame in a WAVE format audio file and is given such that the numbers of 0 to 4 are used repeatedly (e.g., 0, 1, 2, 3, 4, 0, 1, 2, ...). When a recording is started, Sequence NO. is 0 (zero). However, in the case of a clip newly produced in an editing operation, Sequence NO. of the top is recorded.

"Start TC" is a start time code value recorded in video data of a clip.

"Drop Frame" is information that shows that time codes of the material (also including Start TC and End TC) are recorded by a drop frame mode. Thus, "1" represents a drop frame recorded by drop frame mode and "0" represents a non-drop frame recorded by non-drop frame mode.

"End TC" means a final time code value of a clip.

"Continuous TC Flag" is a flag that shows whether time codes between "Start TC" and "End TC" are counted up continuously or not. Thus, "1" shows "continuous" and "0" shows "discontinuous".

"Valid TC Flag" is a flag that shows the validity of a time code in the video data. Thus, "1" shows "valid" and "0" shows "invalid (not reliable time code). Although the present invention describes "Valid TC Flag" as metadata showing the validity of a time code, the same effect also can be provided by describing "Valid TC Flag" as metadata (flag) showing a request for a compulsory change of the time code. In this case, "Valid TC Flag" can be used by setting "0" showing a case where a compulsory change is performed and "1" showing a case where a compulsory change is not performed (a time code in the video data is set to be valid).

Figures 5, 6:
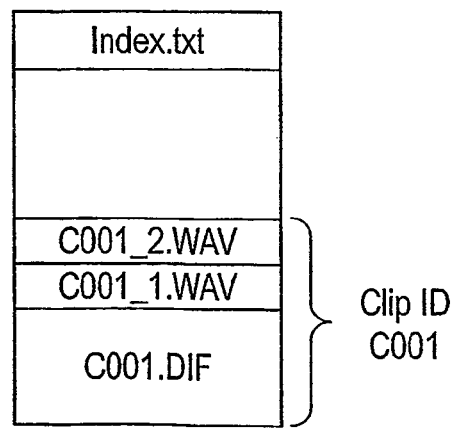
FIG. 5 shows an example of the description of an index file.
FIG. 6 shows the contents of an index file and a recording memory after a recording operation.

FIG. 5 shows an example of the description of the index file as described above. The index file illustrated here is a text format file in which CSV (Comma Separated Value) format is used to divide the respective elements by commas.

The camera recorder as the video processing device of the present invention is characterized in that the camera recorder records applicable data to these items as metadata whenever index file processing means 104 generates the clip index table including "End TC", "Continuous TC Flag", and "Valid TC Flag" items as described above in recording memory 116 and executes a processing for recording each clip.

Next, a method for generating metadata set in the media index table and clip index table as described above will be described mainly with regards to the data regarding a time code.

First, when compressed video data is recorded, there are two cases. In the first case, time codes are automatically generated in the device. In the second case, time codes are inputted from an external input (e.g., recording by an input of time codes from outside, recording of video data including time codes).

When time codes are automatically generated in the device, a time code increments frame by frame based on "New TC Proposal" in the index file. The incremented time code is stored in a specified region in compressed video data to be recorded. Specifically, as described above, "New TC Proposal" is recorded, in a previous preparation of the clip, with a start request time code used as the top time code of the compressed video data to be newly recorded. Thus, index file processing means 104 refers to this start request time code to give the time code to a specified region in the video data so that the frame No. is increased by one frame by frame based on this time code value.

When time codes are inputted from an external input, the increment of a time code being recorded is not performed and the inputted time codes are given to video data as it is.

In the manner as described above, this camera recorder stores not only the compressed video data but also stores time codes into a specified region in the compressed video data so that the compressed video data including time codes corresponding to the respective frames is recorded in recording memory 116.

When the recording is completed, "New TC Proposal" of the index file is changed to a time code value showing a time subsequent to a time at which the recording is completed in the recording period by adding 1 (one) to the time code value given to the compressed video data finally recorded at the end of the clip. Then, the changed time code value is recorded. It is noted that the calculation for adding 1 (one) to the time code is performed with the consideration of time, minute, second, frame digit and a time code specification (SMPTE-12M) such as a drop frame.

By the use of "New TC Proposal" as described above, a complicated processing for determining a time code to a top frame of compressed video data to be newly recorded for example is eliminated. As a result, time codes given to compressed video data during a recording can be determined with a high speed.

In the above-described recording processing, at the start of a recording, a time code value of compressed video data at the start of the clip is obtained so that this time code value is recorded as data set in "Start TC". During the recording, continuousness detection unit 140 checks, prior to the compression or packeting, time codes to be recorded (generated time codes or time codes inputted from outside) for every one frame to check whether the time codes are continuous or not while counting the number of frames being recorded. When the recording is completed, continuousness detection unit 140 notifies, to index file processing means 104, the result of the detection of the continuousness showing whether the time codes are continuous or not and the total number of recorded frames. Index file processing means 104 records the notified result of the detection of the continuousness of the time codes into "Continuous TC Flag" in the clip index table of recording memory 116 and also records the notified total number of frames into "Duration" in the clip index table. Furthermore, index file processing means 104 also records the time code value of finally-compressed video data as "End TC". Since correct time codes are given to the video data, "Valid TC Flag" is set as valid (1) and is recorded by index file processing means 104 into "Valid TC Flag" section. However, when time codes are automatically generated in the device, "Continuous TC Flag" can be determined without checking the time codes. Desirably, continuous time codes are given and "Continuous TC Flag" is set as continuous (1).

For example, after the recording for 5 minutes, 6 seconds, and 7 frames from the time code of 00:00:00:00, the index file (shown by "Index.txt") and recording memory 116 have the file configurations as shown in FIG. 6.

When a compression encoding method used by encoder 131 is an intra-frame compression method, it is possible to detect continuousness of time codes and to count the total number of recorded frames after the compression. However, when an inter-frame compression method (e.g., MPEG2) is used, the detection of continuousness of time codes and the counting of the total number of recorded frames are desirably performed prior to the compression.

As described above, the video processing device in one embodiment of the present invention has been described with regards to the structure and the basic operation by using an example of a camera recorder. As described above, this camera recorder includes system control unit 101 as described below. System control unit 101 records, into recording medium 116, the compressed video data as a video file that is supplied from encoder 131 during a recording period from a recording start time to a recording end time and records, into recording medium 116, additional data as an index file that is information related to the compressed video data recorded in recording medium 116. System control unit 101 also reproduces, from the video file set in recording medium 116, the compressed video data for reading the additional data from the index file. Furthermore, system control unit 101 records, into recording memory 116, additional data regarding the compressed video data recorded during the recording period as well as another additional data including "New TC Proposal" as a time code value showing the time at which the compressed video data to be recorded next is started as additional data to be recorded in the index file. Furthermore, the additional data to be recorded in the index file is additional data as additional data regarding the compressed video data recorded during the recording period that includes: "Duration" corresponding to the time required for the video shooting; "Continuous TC Flag" as information showing the continuousness of the time codes; "Start TC" as a time code value showing the start time of the recording period; and "End TC" as a time code value showing the recording end time. Hereinafter, an operation of the camera recorder of this embodiment will be described in detail by taking a more specific example.

A processing suitable to the recording by video processing unit 132 is performed to a video signal from camera unit 137. Then, the signal is compressed and encoded by the compression/encoding processing by encoder 131. The following section will describe, as an example of a compression encoding processing, a processing based on SMPTE-314M (DV-Based 25M) method in which this camera recorder performs a recording and a reproduction based on SMPTE-314M and will describe the operation thereof.

In this camera recorder, video data is compressed by the SMPTE-314M-based compression processing to have a code amount about ⅕ of the original amount. Video file processing means 102 subjects the SMPTE-314M-based compressed video data to a filing frame by frame (DIF format file). As described above, according to the SMPTE-314M specification, the minimum unit of the compressed video data is called as a DIF block, a plurality of DIF blocks constitute one frame, and a set of such frames constitute one DIF format file. According to the NTSC standard television method, an amount of data per one frame of a DIF format file is a fixed amount of 120000 Byte.

Figure 7A:
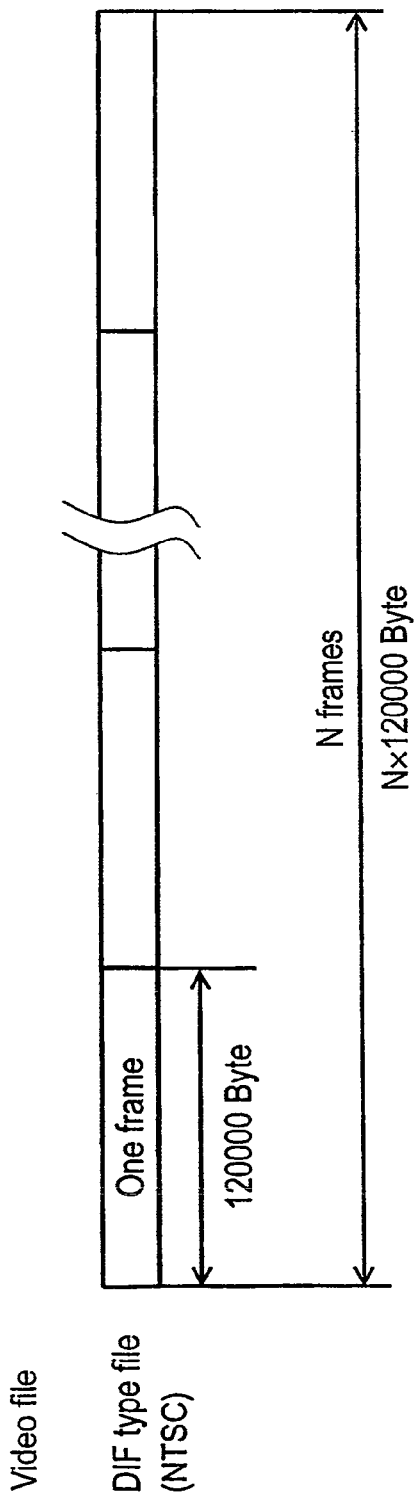
FIG. 7A shows the structure of a DIF format file.

FIG. 7A shows the structure of a DIF format file. A DIF format file is structured to include no file header or the like in which pieces of compression data are arranged in an order of frames. Thus, when N frames are recorded in a DIF format file, the file size is N times larger than the above code amount per one frame.

Although the DIF format file can store therein two audio channels, this embodiment does not use an audio data region in the DIF format file. Instead, audio data is illustratively recorded in another file. The reason is that an editing operation for a professional application as in a broadcasting station is frequently performed so that the video and the audio are edited in an independent manner and a nonlinear editor for a professional use generally handles a video file and an audio file as separate files.

Next, a processing suitable to the recording by audio processing unit 135 is performed to the audio signal from microphone unit 138. Thereafter, the audio signal is subjected to a Wave format filing by audio file processing means 103. Specifically, an example of a case in which audio data is recorded based on the Wave format method will be described.

Figure 7B:
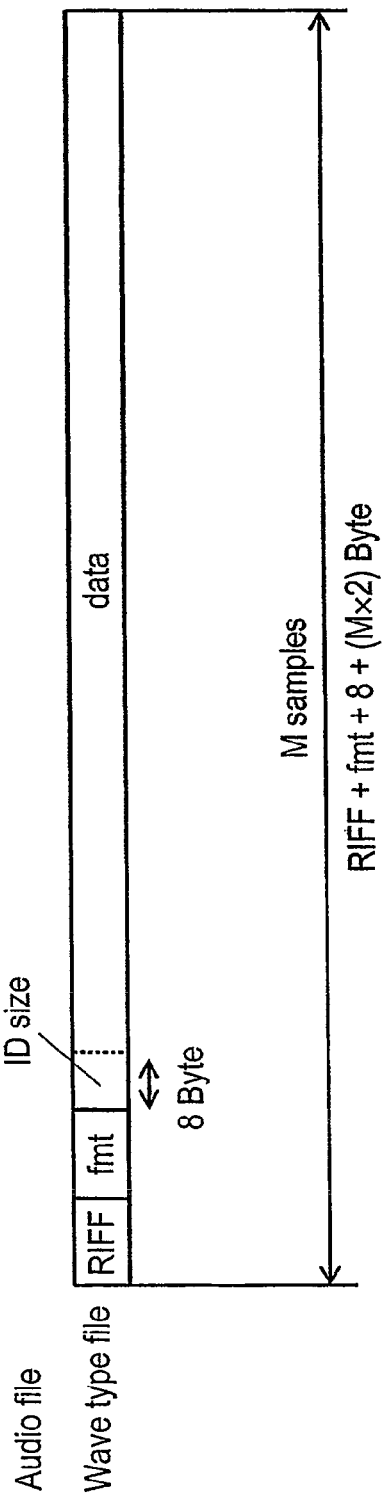
FIG. 7B shows the structure of a Wave format file.

FIG. 7B shows the structure of a Wave format file. A Wave file is the one of RIFF (Resource Interchange File Format)

and is composed of a plurality of "chunks" as basic units. Each chunk is composed of a four-letter ID (ASCII 4 Byte), a four-byte chunk data size, and actual chunk data. The top of the file includes a RIFF chunk, showing that the file is the Wave format one. A "fmt" chunk stores therein structures such as a sample frequency of audio data stored in the file and the number subjected to quantization. A data chunk stores therein a chunk ID, a chunk size, and actual audio data in this order. When the amount to be subjected to audio quantization is 16 bit, the file size is "RIFF+fmt+8+(M×2)" Byte, where:
RIFF=byte count of RIFF chunk;
fmt=byte count of fmt chunk; and
M=the number of total samples of audio data.

Audio files are recorded independently for the respective channels. Thus, when the number of channels of audio to be recorded is two, two Wave files are independently recorded for the respective two channels.

Recording memory 116 is formatted by a file system (e.g., FAT16). A file writing into recording memory 116 is performed by file system processing means 106 in system control unit 101 by the update of FAT management information and an operation for writing data into recording memory 116.

An operation for recording video and audio is performed in accordance with an instruction via input unit 130. When an instruction is given to start the recording to recording memory 116 specified by recording memory processing means 105, one DIF format compression video file and two Wave files for recording the audio are opened and the data is recorded. At this recording, the recording start time of the video and the recording start time of the audio are synchronized.

The data writing to recording memory 116 is completed when an instruction for stopping the recording operation is given, thereby closing the above file. Thus, by this execution of continuous recording operations using one clip, one video file and two audio files are newly produced.

Figure 8:
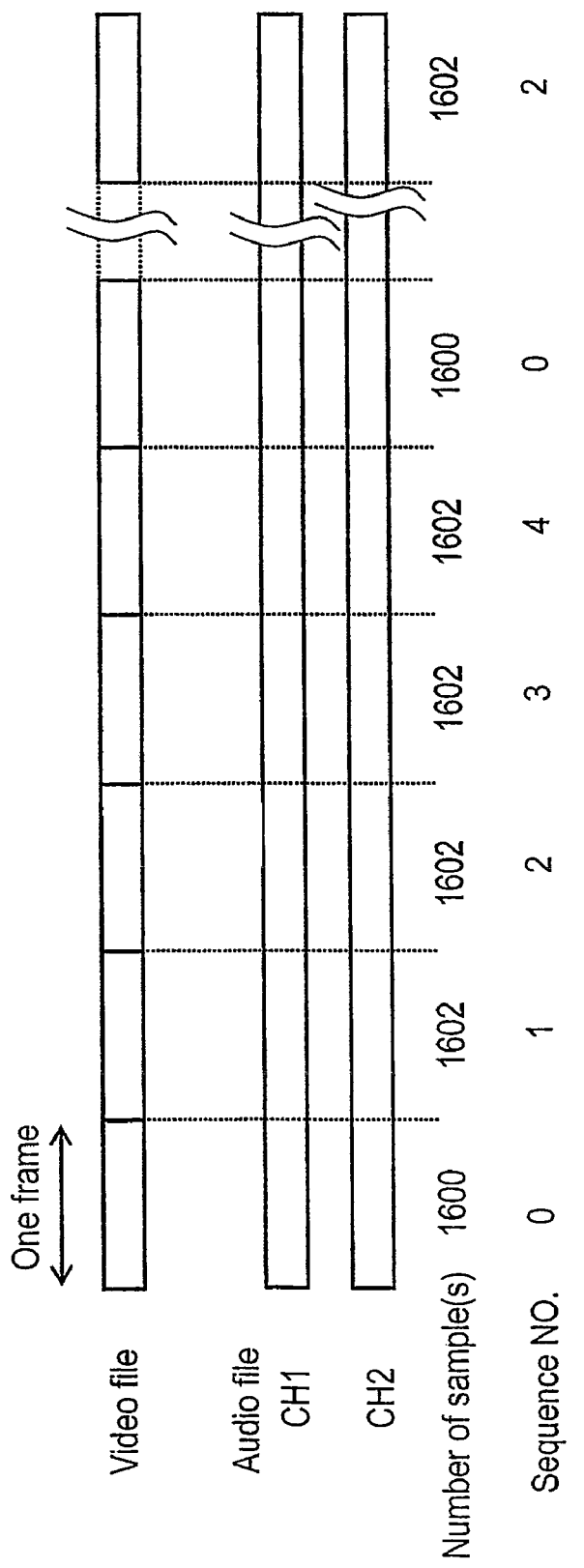
FIG. 8 shows a relation between a video file and an audio file when they are synchronized.

Here, synchronization of a video file and an audio file during the recording will be described. FIG. 8 shows a relation between a video file and an audio file when they are synchronized. In the case where a NTSC standard television method is used with a frame frequency of 29.97 Hz and when an audio sample cycle is 48 kHz, the number of audio samples within one frame time is not an integer and is an integer within five frame times. Although a Wave format audio file does not describe a video frame cycle, in order to obtain the synchronization with the video, the number of samples per a frame is counted so that the number is changed to be 1600, 1602, 1602, 1602, and 1602 for every five frame cycles so that the number of samples from the start of the recording to the end of the recording is calculated based on these five frames. A phase of the repetition of these five frames is represented by Sequence NO. and Sequence NO. is represented by the repetition of 0 to 4. Thus, the data size per one frame is obtained as shown below.

1600×2 Byte (Sequence NO.=0)
1602×2 Byte (Sequence NO.=1, 2, 3, and 4)

By these formulae, the file size of the Wave file having a predetermined number of frames can be calculated. Sequence NO. at the start of the recording is 0.

A method for recording, in the specific configuration as described above, material data into recording memory 116 will be described.

First, when the recording of compressed video data is started, index file processing means 104 refers to "New TC Proposal" in an index file to give time codes to a predetermined region in the video data so that the respective frames subsequent to the frame for the time code value have frame Nos. that are increased by 1 (one). Index file processing means 104 also obtains, from continuousness detection unit 140, a time code value of compressed video data at the start of the clip and records this time code value as data to be set as "Start TC".

During the recording, continuousness detection unit 140 checks every one frame of a to-be-recorded time code before the time codes are compressed or packetized to detect whether they are continuous or not. At the same time, continuousness detection unit 140 counts the number of frames being recorded.

Furthermore, at the end of the recording, index file processing means 104 changes "New TC Proposal" of the index file to a time code value obtained by adding 1 (one) to a time code value given to compressed video data recorded at the end of the clip and records the time code value. Continuousness detection unit 140 notifies, to index file processing means 104, the result of the detection of the continuousness showing whether the time codes are continuous or not and the total number of recorded frames. Index file processing means 104 records the notified result of the detection of the continuousness of the time codes into "Continuous TC Flag" in the clip index table of recording memory 116 and also records the notified total number of frames into "Duration" in the clip index table. Furthermore, index file processing means 104 also records the time code value of the finally-compressed video data as "End TC". Since correct time codes are given to the video data, "Valid TC Flag" is set as valid (1) and is recorded by index file processing means 104 into "Valid TC Flag" item.

Next, a method for reproducing the data recorded in recording memory 116 as described above by starting the reproduction with a specified time code will be described.

First, a time code value (T) from which the reproduction is desired to be started is inputted via input unit 130. In order to start the reproduction from the inputted time code value, Step 1 specifies a clip including the time code value. Step 2 must specify the number of frames from the top of the clip (offset). Step 3 must specify the position in the file. Hereinafter, Step 1 to Step 3 as described above will be described.

First, it is assumed that "n" clips are recorded in recording memory 116 and "Start TC" of clip "i" is "TSi" and "End TC" is "TEi".

In this case, Step 1 as a processing for specifying a clip checks whether "i" that satisfies $TSi \leq T \leq TEi$ ("i" is 1 to n) exists or not. When "i" that satisfies $TSi \leq T \leq TEi$ does not exist, it shows absence of inputted time code T, thus showing that there is no video data applicable to the time code inputted via display unit 139. When "i" satisfying the above formula exists, it shows that "T" is included in "n" clips, thereby performing Step 2 for specifying an offset. However, when there are two or more "i" satisfying the above formula, the user is notified that there are two or more applicable time codes and the clip information, thus allowing the user to select a desired clip to perform Step 2 for specifying an offset.

Step 2 for specifying an offset is performed based on To=T−TSi when assuming that Offset is To (frame).

Step 3 for specifying a position in a file provides a value obtained by multiplying "To" with the byte count per one frame. For example, in a DIF format video file, a position from which the byte count obtained by To×120000 (byte) is skipped from the top of the file may be read.

In the case of a Wave audio file, a position from which Ta (byte) obtained by the following formulae is skipped from the top of the file may be read. In the formulae, "SN" represents Sequence NO., "div" represents quotient, "mod" represents surplus, "Tsmaple" represents the number of samples until the searched frame is reached, "d" represents the number of repetitions of the sequence, "a" represents the number of surplus frames of the sequence, and "b" shows whether the surplus frames of the sequence include frames of 1600 samples or not.

$$Ta = RIFF + fmt + 8 + (Tsmaple \times 2)$$

$$Tsmaple = ((1600 + 1602*4) \times d) + (1602 \times a) - (2 \times b)$$

d=To div 5
a=To mod 5
b=0: a=0
1: a≠0, SN=0
1: a>5−SN, a≠0, SN≠0
0: a≦5−SN, a≠0, SN≠0

As described above, in this camera recorder, the data regarding time codes of "Start TC" and "End TC" of the clip that is specified to be reproduced is recorded in the clip index table of recording memory 116 and, when the clip is reproduced, the time codes of "Start TC" and "End TC" of the specified clip can be read easily. Thus, only the execution of Steps 1 to 3 as described above can provide the reproduction started from the specified time code value. As a result, a high-speed processing is provided when the reproduction is started from an arbitrary time code value. Specifically, by inputting a time code of video data desired by a user for example, the applicable video data can be reproduced instantly.

Next, a reproduction method for calculating a time code based on "Start TC" and the number of frames of reproduction video data will be described.

When "Valid TC Flag" is valid (1), time codes recorded in compressed video data are read. Then, the time codes are processed by display processing means 110 so that the time codes correspond to video data being reproduced. Then, the time codes of the respective frames are displayed by display unit 139.

When "Valid TC Flag" is invalid (0), time codes to be displayed on display unit 139 are calculated based on the clip being reproduced and the number of frames in the clip. The clip being reproduced and the number of frames from the top of the clip are obtained by video file processing means 102 and number of to-be-reproduced frames detection unit 141. Video file processing means 102 is a unit that sends compressed video data from the video file in accordance with an instruction for reproduction and thus can specify the clip being reproduced. Based on the compressed video data sent by video file processing means 102, the number of frames in the clip is determined in consideration of the delay of the processing until the data is outputted from decoder 133 via reproduction buffer memory 109. Based on the clip being reproduced and the number of frames in the clip (TCoffset), a time code calculated by adding the time codes from "Start TC" to "TCoffset" of the clip is displayed by display unit 139 as a current time code.

By the processing as described above, when "Continuous TC Flag" is continuous (1), time codes corresponding to the time codes in the video data can be presented without taking the time codes from the video data. Continuous time codes that are different from the time codes in the video data also can be presented easily.

Next, a method will be described for detecting the existence of duplicate time codes with a high speed when a plurality of clips are searched.

First, when there is only one clip in recording memory 116, "Continuous TC Flag" can be used to easily determine whether duplicate time codes exist or not. When "Continuous TC Flag" is continuous (1), there is no duplicate time codes.

When "Continuous TC Flag" is discontinuous (0) on the other hand, a point at which time codes in the video data are discontinued must be searched to check the existence of duplicate time codes. However, in actual operations, there are very few cases where discontinuous time codes are recorded. Thus, in most cases, a processing for checking the existence of duplicate time codes can be performed with a high speed.

When the total number of clips in recording memory 116 is "n" ("n" is 2 or more), time codes are sorted in an order of "Start TC" and are sequentially numbered with 1 to "n". When assuming that clip "i" has "Start TC" of "TSi" and "End TC" of "TEi" and when "n" clips include "Continuous TC Flags" that are all continuous (1), it can be judged that there is no duplicate time codes when the following formulae are all satisfied.

$$TE1 < TS2$$

$$TE2 < TS3$$

...

$$TS(n-1) < TEn (\text{"n" is 2 or more})$$

When all "Continuous TC Flags" are not continuous (1), with regards to a clip for which "Continuous TC Flag" is discontinuous (0), a point at which time codes in the video data are discontinued is searched to check the existence of duplicate time codes.

By the processing as described above, duplicate time codes of all clips in the recording memory can be detected with a high speed. Absence of duplicate time codes shows the status in which continuity of time codes in recording memory 116 can be assured. Thus, material can be quickly searched based on times codes when there are a plurality of clips and the material can be specified with the continuity, improving an editing efficiency.

Next, a method will be described for continuously reproducing time codes in a plurality of clips.

An index file is a text format file and thus can be changed easily. On the other hand, the method for presenting, regardless of the time codes in video data, continuous time codes by the use of "Start TC" and "Valid TC Flag" has been described. By changing the index file and based on the above reproduction method, the presentation of continuous time codes in a plurality of clips can be realized easily.

This continuous reproduction method will be described with regards to the preparation of a list describing an order of clips to be reproduced or the use of a plurality of "n" clips (C1 to Cn) that are arranged in an order of the time at which they are recorded, for example.

Step 1 changes "Start TC" of top clip C1 to a time code value at which the reproduction is desired to be started and changes "Continuous TC Flag" to continuous (1), and changes "End TC" to "Start TC"+"Duration", and changes "Valid TC Flag" to invalid (0).

Step 2 changes "Start TC" of next clip C2 to "End TC"+one frame time of top clip C1 and, as in Step 1, changes "Continuous TC Flag" to continuous (1), changes "End TC" to "Start TC"+"Duration", and changes "Valid TC Flag" to invalid (0).

Then, Step 2 is repeated to change index files regarding all clips (C1 to Cn). Then, the changed index files are reproduced by the above reproduction method, thereby presenting continuous time codes from C1 to Cn.

The index file described in FIG. 9 for example is changed to be as shown in FIG. 10. The start time code and end time code of clip C003 and C004 that were the cause of the discontinuity among clips are changed so as to be continuous among clips, all "Continuous TC Flags" are changed to continuous (1), and all "Valid TC Flags" are changed to invalid (0). "New TC Proposal" is also changed to have a value (00:14:10:19) obtained by adding one frame time to the final time code value (00:14:10:18) of final clip C004. As a result, when the second recording into this recording memory is performed, the above-described recording method can be used to obtain continuous time codes from C004.

By the processing as described above, only the change of the index file can present continuous time codes when the time codes in the video data is caused to be discontinuous due to an editing step in particular. Continuous time codes also can be presented at the reproduction without adding time codes to the video data at the recording.

Next, a case will be described in which the camera recorder as the video processing device of the present invention is used as a reproducer in an editing operation in a linear editing system.

A linear editing system using VTR requires phase synchronization by a time code and requires running start zones before and after a clip. Thus, when required video is positioned within few seconds from the top of the clip, the video is difficult to be edited. To solve this, dummy time codes before and after the clip are presented in accordance with the reproduction speed, thus allowing even the top video to be edited easily.

When this is incorporated in a linear editing system, the system is operated so as to output, when the clip reproduction is started, dummy video data of "T" dummy seconds (or desirably five seconds) (e.g., video data of black or a start frame). The reproduction start time code can be easily calculated by "Start TC"−Tdummy. The dummy video data is also sent when the clip reproduction is completed and the time codes are incremented by an amount of "End TC" to "End TC"+Tdummy in accordance with the number of to-be-reproduced frames detected by number of to-be-reproduced frames detection unit 141.

By providing the video processing device of the present invention in the linear editing system, the system can perform an editing as in conventional VTRs or the like and can have a smooth shift from a linear editing system to a non-linear editing system.

Although this embodiment describes the compression method using SMPTE-314M, any compression method may be used so long as the method is the intra-frame-and-fixed-length one. An inter-frame compression method (e.g., MPEG2) also may be used. Furthermore, although this embodiment describes an index file of CSV format, the index file also can be described by a markup language such as XML (Extensible Markup Language). Although this embodiment describes a case in which one recording memory is used, a recording/reproduction device also may be used that includes a plurality of slots to which recording memories are attached so that a plurality of recording memories are handled at the same time.

INDUSTRIAL APPLICABILITY

The video processing device according to the present invention intends to be used as a device such as a camera recorder to reduce the time required for searching material recorded in a randomly-accessible recording medium. The video processing device according to the present invention can be widely applied to video recording-reproduction devices using a semiconductor memory or an optical disk, for example.

The invention claimed is:

1. A video processing device for recording, into a recording medium providing recording and reproduction, recording information including a compression-encoded video data and for reproducing the recording information recorded in the recording medium, comprising:

a camera unit for supplying a video data to be recorded in the recording medium;

an encoder for generating a compressed video data by compressing and encoding the video data from the camera unit;

a system control unit for recording, into the recording medium, the compressed video data as a video file that is supplied from the encoder during a recording period from a recording start time to a recording end time and for recording, into the recording medium, an additional data as an index file that is information related to the compressed video data recorded in the recording medium, and for reproducing, from the video file recorded in the recording medium, the compressed video data and for reading the additional data from the index file; and an input unit for accepting a recording start instruction and a recording end instruction, wherein the system control unit records before accepting the recording start instruction, into the recording medium, the additional data recorded in the index file, the additional data composed of additional data regarding the compressed video data recorded during the recording period and another additional data including a time code value showing a time at which the recording of a compressed video data to be recorded next is started;

wherein the system control unit reads, when starting to record to the recording medium after accepting the recording start instruction, the additional data recorded in the index file and recognizes a time code value showing a recording start time of a to-be-recorded-next compressed video data included in the additional data as a time code value showing the time of a frame at which the compressed video data is started;

a continuousness detection unit for detecting a continuousness of the time codes in every frame from a video frame corresponding to the recording start instruction to a video frame corresponding to the recording end instruction;

wherein the system control unit records, when recording the compressed video data, an information showing the continuousness of all time code values within the recording period detected by the continuousness detection unit into the index file, associating with the compressed video data; and wherein the additional data recorded in the index file is additional data regarding the compressed video data recorded during the recording period that includes a time required for a video shooting, information showing continuousness of time codes, and the time code value showing the recording start time of the recording period.

2. The video processing device according to claim 1, wherein the input unit acquires the time code value specifying an arbitrary frame of start of reproduction;

wherein the system control unit reads, when starting the reproduction from a position of the video frame including the time code value inputted via the input unit in the recording medium, a time required for the video shooting, information showing the continuousness of the time codes, and the time code value showing the recording start time of the recording period that are included in the additional data recorded in the index file;

wherein the system control unit specifies, when the time code indicates continuousness, a position in the compressed video data from which the reproduction is started based on the time required for the video shooting and the time code value showing the recording start time of the recording period, without referring to the time code value included in the compressed video data; and wherein the system control unit specifies, when the time code does not indicate continuousness, a position in the compressed video data from which the reproduction is started based on the time required for the video shooting and the time code value showing the recording start time of the recording period, with referring to the time code values included in the compressed video data.

3. The video processing device according to claim 2, further comprising a number of to-be-reproduced frames detection unit for detecting the number of frames for which a video data is being reproduced, wherein the system control unit calculates, when reproducing the compressed video data recorded in the recording medium and when the information showing the continuousness of the time codes recorded in the index file shows the continuousness of the time codes, the time code of an image currently reproduced based on the time code value showing the recording start time of the recording period and the number of frames notified from the number of to-be-reproduced frames detection unit, without referring to the time code value included in the compressed video data; and wherein the system control unit offers, when the continuousness is not shown, a time code value of a picture currently being reproduced, with referring to the time code value included in the compressed vide data.

4. The video processing device according to claim 3, further comprising a means for changing the time code value showing the recording start time of the recording period to arbitrary time code value, wherein the system control unit calculates other time code value than a time code recorded in the compressed video data, based on a number of reproduced frame of the compressed video data.

5. The video processing device according to claim 4, further comprising a means for adding or changing information showing the validity of the time code value recorded in the compressed video data, wherein the system control unit adds or changes the information showing the validity when ending a recording of the compressed video data or changing the time code value showing the recording start time of the recording period; and wherein when the information showing the validity shows a valid time code in reproducing, the time code value in the compressed video data is used for a time code for presentation and, when the information showing the validity shows an invalid time code, a time code value calculated based on the time code value showing the recording start time of the recording period is used as a time code for presentation.

6. The video processing device according to claim 5, wherein, from a top compressed video data in a plurality of compressed video data that are arranged in an order of reproduction, time code values showing start of recording recorded in the index file is changed to a time code value showing later value of end of record, and information showing valid time codes recorded in the compressed video data is changed to be invalid, thereby continuous time codes among a plurality of compressed video data are presented.

7. The video processing device according to claim 5, further comprising a means for generating continuous dummy time codes before and after a compressed video data to be reproduced, wherein the dummy time code before the compressed video data is deducted from the start time code value and the dummy time code after the compressed video data is added to the final time code value so that the dummy time codes are continuously presented in every frame and continuous time codes are presented without the compressed video data.

8. The video processing device according to claim 1, wherein the additional data recorded in the index file is additional data regarding the compressed video data recorded during the recording period that includes a time code value showing the recording end time of the compressed video data recorded during the recording period; and wherein the system control unit makes, when an information of continuousness of the time code recorded in individual index file indicates continuousness, comparison between a start time code value showing the recording start time and a final time code value showing the recording end time that are recorded in each index file to detect existence or absence of duplicate time codes in the compressed video data recorded in each video file, without referring to the time code value included in the compressed video data.

9. A video processing device for recording, into a recording medium providing recording and reproduction, recording information including a compression-encoded video data and for reproducing the recording information recorded in the recording medium, comprising:

a camera unit for supplying a video data to be recorded in the recording medium;

an encoder for generating a compressed video data by compressing and encoding the video data from the camera unit;

a system control unit for recording, into the recording medium, the compressed video data as a video file that is supplied from the encoder during a recording period from a recording start time to a recording end time and for recording, into the recording medium, an additional data as an index file that is information related to the compressed video data recorded in the recording medium, and for reproducing, from the video file recorded in the recording medium, the compressed video data and for reading the additional data from the index file; and an input unit for accepting a recording start instruction and a recording end instruction, wherein the system control unit records before accepting the recording start instruction, into the recording medium, the additional data recorded in the index file, the additional data composed of additional data regarding the compressed video data recorded during the recording period and another additional data including a time code value showing a time at which the recording of a compressed video data to be recorded next is started;

wherein the system control unit reads, when starting to record to the recording medium after accepting the recording start instruction, the additional data recorded in the index file and recognizes a time code value showing a recording start time of a to-be-recorded-next compressed video data included in the additional data as a time code value showing the time of a frame at which the compressed video data is started;

wherein the system control unit records, into the index file, when accepting the recording end instruction, the time code value determined by incrementing the recording end time of the recording period as the time code value showing the recording start time of the to-be-recorded next compressed video data, and the system control unit records when accepting the recording start instruction, the compressed video data including one of continuous time code values in every frame, a top of the time code values showing the recording start time of the to-be-recorded next compressed video data in the index file.

* * * * *

UNITED STATES PATENT AND TRADEMARK OFFICE
CERTIFICATE OF CORRECTION

| | |
|---|---|
| PATENT NO. | : 8,145,041 B2 |
| APPLICATION NO. | : 11/721604 |
| DATED | : March 27, 2012 |
| INVENTOR(S) | : Hisataka Ueda et al. |

It is certified that error appears in the above-identified patent and that said Letters Patent is hereby corrected as shown below:

In column 19, line 35 of the Letters Patent, in claim 3 (Amendment claim 9), "compressed vide data" should read --compressed video data--.

Signed and Sealed this
Seventh Day of August, 2012

David J. Kappos
*Director of the United States Patent and Trademark Office*